United States Patent [19]
Sigl et al.

[11] Patent Number: 6,163,085
[45] Date of Patent: Dec. 19, 2000

[54] METHOD AND APPARATUS FOR SELECTING INPUT VOLTAGE FOR A POWER SUPPLY

[75] Inventors: Dennis Sigl; Steven Geissler, both of Appleton, Wis.

[73] Assignee: Illinois Tool Works Inc., Glenview, Ill.

[21] Appl. No.: 08/979,460

[22] Filed: Nov. 26, 1997

[51] Int. Cl.⁷ ...................................................... H02J 4/00
[52] U.S. Cl. ............................. 307/43; 307/75; 361/752
[58] Field of Search ................................ 307/43, 44, 75; 361/752

[56] References Cited

U.S. PATENT DOCUMENTS 4,730,122  3/1988  Dreibelbis et al. ...................... 307/75

*Primary Examiner*—Josie Ballato
*Assistant Examiner*—Rios Roberto
*Attorney, Agent, or Firm*—George R. Corrigan

[57] ABSTRACT

A power supply that receives an input voltage and provides output power is described. A method for selecting one of a plurality of input voltages by moving first and second links is also described. The power supply includes a housing and the links are inside the housing. The links configure the power supply to receive a selected input voltage from a number of input voltages, depending upon the position they are in. The links depend on one another. Indicators are connected to the links, and show for what input voltage the links are connected. The indicators are visible from outside the housing. The housing includes one or more windows through which the indicators are visible. The indicators are alpha-numeric characters or drawings. The links includes a circuit board with the indicators mounted thereon and a plug or a set of copper bars that are placed in either the first or second position.

22 Claims, 4 Drawing Sheets

METHOD AND APPARATUS FOR SELECTING INPUT VOLTAGE FOR A POWER SUPPLY

FIELD OF THE INVENTION

The present invention relates generally to the art of power sources. More specifically, this invention relates to power sources used in welding, plasma cutting, and heating applications.

BACKGROUND OF THE INVENTION

Power sources typically convert a power or voltage input to a necessary or desirable power output tailored for a specific application. One such application is welding, for which power sources typically receive a high voltage (230/240V) alternating current (VAC) signal and provide a high current output welding signal. Around the world utility power sources (sinusoidal line voltages) may be 200/280V, 230/240V, 380/415V, 460/480V, 500V and 575V. These sources may be either single phase or three phase and either 50 or 60 Hz. Welding power sources receive such inputs and produce approximately 10–40 VDC high current welding output.

Often, a particular welding power source will be designed to operate in a market where utility power sources will be either 230 volts or 460 volts. Preferably, welding power sources for these markets are designed to be able to receive both of these input powers, and produce the desired output power.

While it is desirable that a welding power source be able to accept more than one input power, it is easier to design the welding power sources for a specific power input. For example, many power sources can not provide essentially the same output over various input voltages. Also, components that operate safely at a particular input power level are often damaged when operating at a higher or lower input power level. Moreover, operating an improperly linked power source could result in personal injury, power source failure or insufficient power.

Accordingly, many prior art power sources are designed such that input circuits are manually adjusted to accommodate a variety of inputs. The circuits may generally be adjusted by changing the transformer turns ratio, changing the impedance of particular circuits in the power source or arranging circuits in series or parallel. Generally, adapting to various inputs requires a power source to be opened so that cables may be adjusted to accommodate the particular voltage input—the operator manually links the power source for the input voltage. Usually, one connection must be linked for the power circuitry, and a second connection must be linked for the control circuitry. The two links were often located in different parts of the machine. Thus, re-linking for a different input voltage required that two separate links be made. Because of the physical separation of the two links it was possible that one link was properly made, the other was not properly made.

A power inverter which is capable of receiving two input voltage levels is disclosed in U.S. Pat. No. 3,815,009, issued to Burger on Jun. 4, 1974. The power invertor of that patent utilizes two switching circuits. The two switching circuits are connected serially when the higher input voltage is received, and in parallel to receive the lower input voltage. The switching circuits are coupled to each other by means of lead wires. The inverter is susceptible to operators errors in configuring the switching circuits for the appropriate voltage level, which can result in power surge, malfunction, and human injury.

Another prior art welding power source that requires manual re-linking is the Miller Synchron 300™. The Synchron™ is designed to receive a variety of input voltages and frequencies. The user manually adjusts tie bars (copper bars) on a circuit board depending upon the input voltage. A window in the casing is provided so that the user can see the actual and desired locations of the bars for 230V and 460V input. Jumpers, located on a terminal strip away from the bars, also had to be adjusted. However, because this power supply had two independent links, it did not provide an easy way to insure that both links were properly made.

One disadvantage with manually linked machines is that the user had to remove the cover and/or decipher the jumper position to determine the power for which the power supply was linked. Accordingly, it was difficult for a user to readily determine for which input power the power supply was linked. Also, because the two links were independent, it was possible to make one correct and one incorrect link.

Other prior art power supplies automatically compensate for various input powers. An example of one such prior art design may be found in U.S. Pat. No. 5,319,533, entitled Power Selection and Protection Circuit Responsive to an Input Voltage for Providing Series or Parallel Connected Invertors. That design provides for connecting invertors in parallel for a higher input power and in series for a lesser input power. While automatically linked machines avoid the problem of mislinked machines, they tend to be more complex and more expensive.

Accordingly, it is desirable for a welding power supply to be designed to receive more than one input by re-linking the machine. Preferably, the machine should be re-linked with relative ease, and done such that it is difficult to make one correct and one incorrect link. Also, the user should be able to readily determine for which input power the machine is linked, without removing the cover. Finally, it is preferable that such a design would be relatively inexpensive and easy to implement.

SUMMARY OF THE PRESENT INVENTION

According to a first aspect of the invention a power supply that receives an input voltage and provides output power includes a housing and a first and a second link located inside the housing. The links configure the power supply to receive a first input voltage when they are in one position. Also, the links configure the power supply to receive a second input voltage when they are in another position. The links depend on each other. A first indicator is connected to the first link and shows for what voltage the links are connected.

The housing includes, in one embodiment, one or more windows through which the indicators are visible. The indicators are alpha-numeric characters in one embodiment, and drawings in another embodiment. One link includes a circuit board that is placed in either position, and the indicators are mounted on the circuit board, and the second link includes a plug moveable from a first receptacle to a second receptacle in one embodiment. Another embodiment provides that the links include a set of copper bars that are placed in either the first or second position.

According to a second aspect of the invention a power supply that receives an input voltage and provides output power includes a housing, and a linking means. The linking means includes two dependent links located inside the housing to configure the power supply to receive one of two input voltages. An indicator means is connected to the linking means, and is used to indicate for which input voltage the power source is connected to receive in one embodiment.

The housing includes a viewing means for viewing the indicator means in one alternative. The indicator means includes alpha-numeric characters in one embodiment and drawings in another embodiment.

The linking means includes a printed circuit board, a plug, or copper bars that are moved to select the input power in various embodiments.

A third aspect of the invention is a method for selecting one of a plurality of input voltages. The method includes the step of positioning two dependent links that are located inside a power supply housing to configure the power supply to receive a selected one of several input voltages. Also, a first indicator, that shows for which input voltage the power supply is configured, is positioned such that it visible from outside the housing, in one embodiment.

An alternative includes positioning the indicator under a window in the housing. The indicator includes alpha-numeric characters in one embodiment, and drawings in another embodiment. The links include a printed circuit board, a plug or copper bars in various alternatives.

Other principal features and advantages of the invention will become apparent to those skilled in the art upon review of the following drawings, the detailed description and the appended claims.

Figure 1:
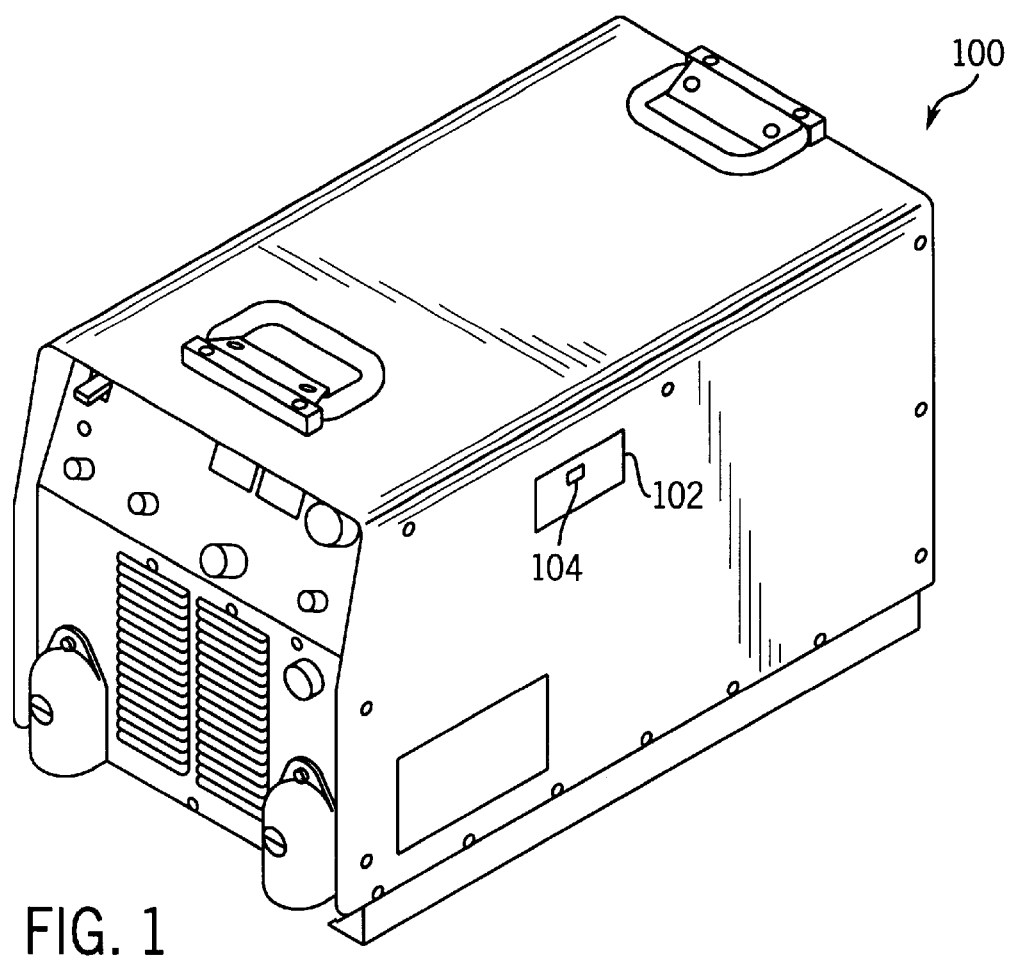
FIG. 1 is a perspective view of a welding power source employing the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular welding power source using a particular window and a particular board behind the window, it should be understood at the outset that the invention may also be employed using other boards, windows designs etc. Additionally, the invention is illustrated with reference to a welding power source. It should also be understood at the outset that the invention may be employed for other power sources such as plasma cutting and induction heating.

Generally, the present invention provides a way for a welding power source to indicate to the user the power for which the power source is linked. A window in the power source housing provides a viewing area under which the voltage (230V or 460V in the preferred embodiment) for which the power source has been linked is displayed. The power source is linked for a desired input voltage by moving a circuit board on the inside of the machine, located directly beneath the window and by moving a plug. One of two indicators is displayed beneath the window, indicating for which voltage the power source has been linked. The position of the board determines which indicator is displayed.

Referring now to FIG. 1, a welding power source 100 is shown. A warning label 102, bearing a warning and a window 104, is disposed on a side panel 101 of the housing, cover or case of welding power source 100. Window 104 is positioned such that a portion of a printed circuit board is located directly behind window 104. Specifically, the user can see through window 104 to one, and only one, of a plurality of voltages written on the circuit board. Which of the voltages is visible (or maybe seen from outside the housing through window 104) depends upon the placement of the circuit board. The circuit board is designed such that it is placed in one of a plurality of positions, depending upon the input voltage for which the machine will be linked. Thus, to select a specific voltage the circuit board is placed in a specific position. The voltage then visible through window 104 is indicative of the voltage for which power source 100 is linked.

Figure 2:
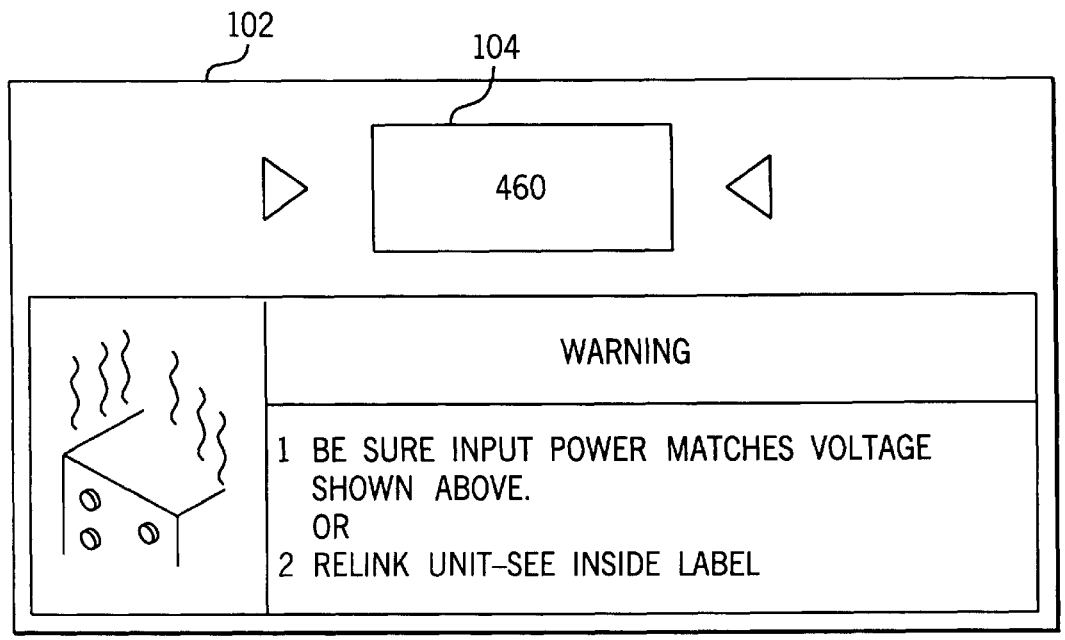
FIG. 2 is a close up of a window on the power source of FIG. 1, when it is linked for 460V.
Figure 3:
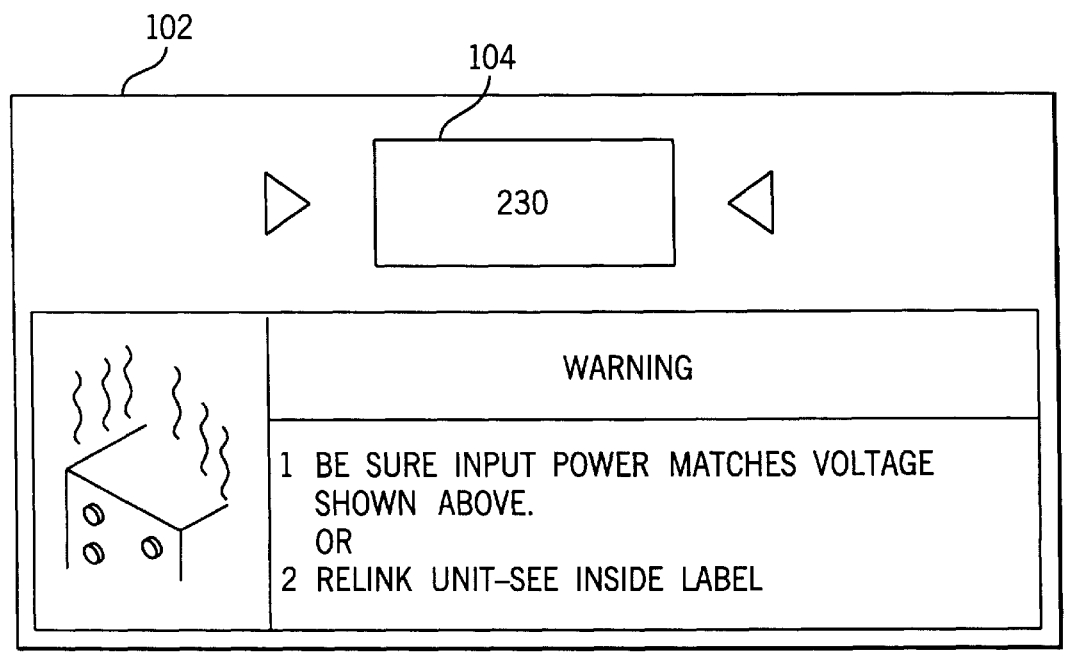
FIG. 3 is a close up of the window on the power source of FIG. 1, when it is linked for 230V.

Label 102 and window 104 maybe seen in detail in FIGS. 2–3. FIG. 2 shows label 102 and window 104 when welding power source 100 has been configured for 460 volts. It may be seen that 460V appears through window 104. FIG. 3 shows label 102 and window 104 when welding power source 100 is configured for 230V. It may be seen that 230V is visible through window 102.

Figure 4:
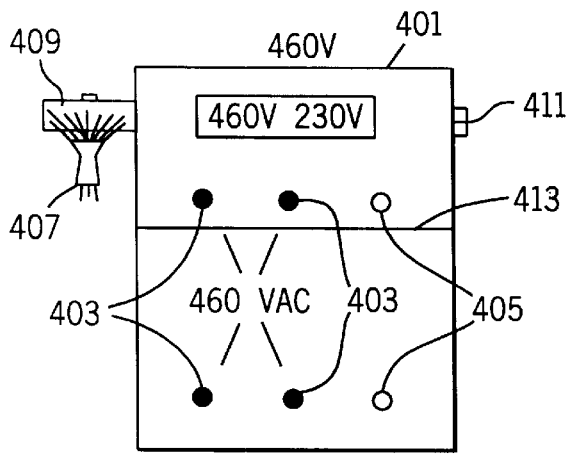
FIG. 4 is a diagram of a printed circuit board behind the window of the power source of FIG. 1, when it is linked for 460V.
Figure 5:
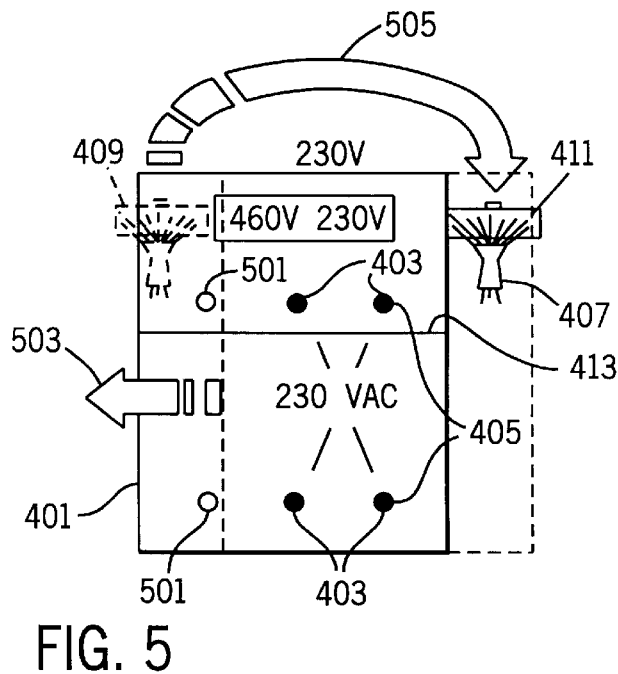
FIG. 5 is a diagram of the printed circuit board behind the window of the power source of FIG. 1, showing how to re-link the power source for 230V.
Figure 6:
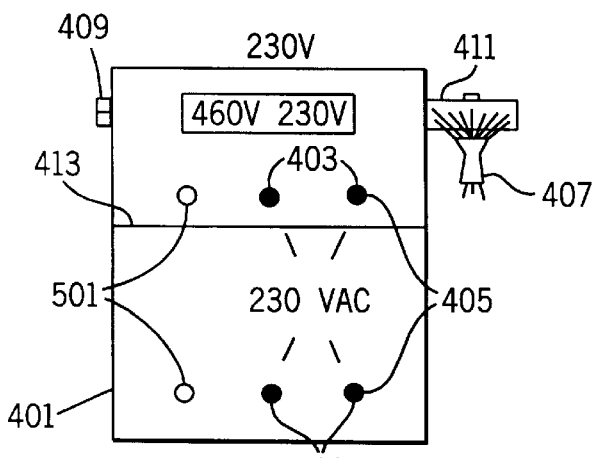
FIG. 6 is diagram of the printed circuit board behind the window of the power source of FIG. 1, when it is linked for 230V.

Referring now to FIGS. 4–6 a circuit board 401, part of which is viewed under window 104, is shown in detail. Circuit board 401 is a link, as link is defined herein. A link, as used herein, is the physical device either moved or reconnected to re-link the power source for a desired input voltage. A link may include jumpers, boards, screws, plugs, receptacles, bars, etc. Positioning the link refers to connecting the two portions (typically one moveable and one fixed) of the link that make an electrical connection to reconfigure the power source.

FIG. 4 shows printed circuit board 401 configured for 460V input. Printed circuit board 401 is held in position by a plurality of screws 403 which pass through four of six holes formed in printed circuit board 401. The center two holes are used for both 460V and 230V connections. A pair of screw holes 405 are not used when power source 100 is linked for 460 volt, but are used for 230V. Additionally, a plug 407 is inserted into a receptacle 409 for the 460 volt connection. The edge of a receptacle 411 is shown under the right side of circuit board 401, and is used for a 230V connection.

Screws 403 hold printed circuit board 401 in place by screwing into holes located in power source 100. Electrical connection is made by screws 403 such that the power circuitry is properly linked for a 460 volt input. Also, when plug or wire harness 407 is inserted into receptacle 409, the control circuitry is properly linked for 460V input.

Referring now to FIG. 5, the changes which are made to re-link the power source for 230 volts may be seen. Side panel 101 (which may be a split panel for easy access) is opened to access board 401. Wire harness 407 is removed from receptacle 409. Also, screws 403 are removed. Circuit board 401 is moved to the left as indicated by an arrow 503 from the dashed position (which indicates the position the circuit board had been in as shown in FIG. 4) to the solid position, such that holes 405 and the center holes are now lined up over the screw holes in the power source 100. Screws 403 are inserted in the center holes and in holes 405. Also, wire harness 407 is inserted into receptacle 411, as indicated by an arrow 505. Since printed circuit board 401 has been moved to the left "230V" is now under window 104, as shown in FIG. 3.

Thus, the physical actions required to re-link power source have caused the indicator to be changed as well. When the side panel is placed back on the machine it is relatively easy and quick for the user to determine for which input voltage the power source 100 has been linked, by merely looking through window 104.

Additionally, because the circuit board exposes the correct receptacle and covers the incorrect receptacle, the user cannot make one correct and one incorrect link. When the circuit board is properly linked, for 230V the only link that can be made with the plug is also for 230V. Likewise, when the circuit board is properly linked for 460V, the only link that can be made with the plug is for 460V. Thus, the links made by the plug and the board are dependent, as dependent is used herein, on each other.

Referring now to FIG. 6, a diagram shows printed circuit board 401 after re-linking for 230V has been completed. It may be easily seen that wire harness 407 is now in receptacle 411. Receptacle 409 is now covered by printed circuit board 401. A pair of screw holes 501, which were used for the 460 volts connection, are not used, while screw holes 405 are in use. Also, the 460V indicator is replaced under the window by 230V.

As may be seen on FIGS. 4–6, printed circuit board 401 is divided into two portions, indicated by a horizontal line 413. The portion of the printed circuit board above line 413 is raised with respect to the portion below line 413. This portion is raised to insure that it will mount above receptacles 409 and 411 without bending the circuit board. The raised portion of the circuit board is riveted to the lower portion of the circuit board in the preferred embodiment.

Printed circuit board 401 is provided with traces in the preferred embodiment which are based on the position of screws 403. Specifically printed circuit board 401 re-links capacitors used to provide the supply voltages in the preferred embodiments. Also, repositioning plug 407 in one or the other of receptacles 409 or 411 links the control transformer with either parallel or series windings, depending upon the receptacle being used. Thus, the transformers and capacitors are re-linked in accordance with the preferred embodiment.

Figure 7:
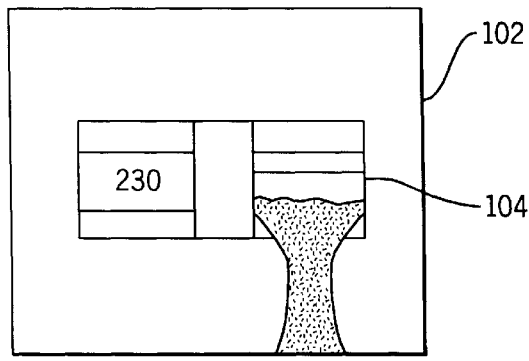
FIG. 7 is diagram of an alternative board behind the window of the power source of FIG. 1, when it is linked for 460V.
Figure 8:
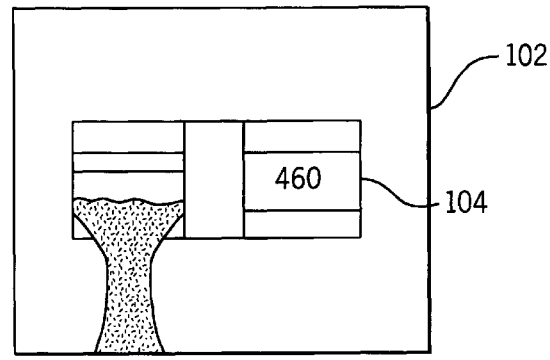
FIG. 8 is diagram of an alternate board behind the window of the power source of FIG. 1, when it is linked for 460V.

Other configurations are also conceivable which allow for a movement of a printed circuit board or other electrical circuit. For example four additional screws could re-link the transformer, rather than a receptacle and plug. Alternatively, only two receptacles could be provided, without screws or a moveable board. Positioning the wire harness in one of the plugs would leave one of the voltage indicators visible in the viewing window. Other alternatives include having two plugs both within viewing window 104. When the harness is moved into one plug it covers up a voltage logo imprinted in that receptacle. This leaves the other voltage indicator visible to the user, as shown in FIGS. 7 and 8.

Figure 9:
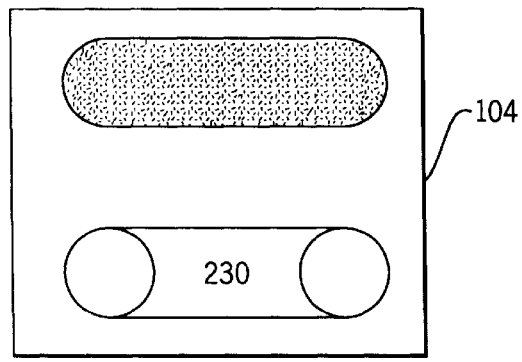
FIG. 9 is a diagram of an alternative circuit board behind the window of the power supply of FIG. 1, when it is linked for 230V.
Figure 10:
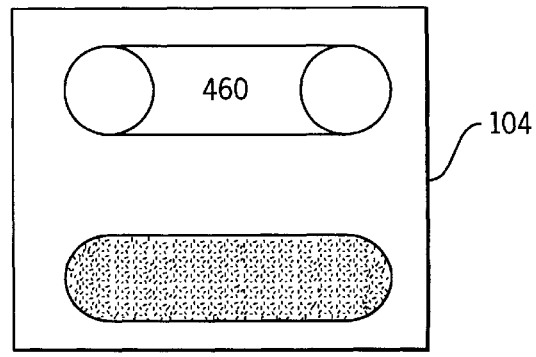
FIG. 10 is a diagram of an alternative board behind the window of the power source of FIG. 1, when it is linked for 230V.

Other alternatives include using copper links instead of a printed circuit board. The copper links could be placed in a horizontal or vertical position with indicators being visible or covered, depending on the position of the bars. Alternatively, the bars could be placed in upper or lower positions, as shown in FIGS. 8–9. Other alternatives include rotating the printed circuit board 180° or 90°, rather than sliding it back and forth.

Numerous modifications may be made to the present invention which still fall within the intended scope hereof. Thus, it should be apparent that there has been provided in accordance with the present invention a method and apparatus for indicating the power for which a power source has been linked, that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A power supply for receiving an input voltage and providing output power comprising:
    a housing;
    a first physical link located inside the housing, that partially configures the power supply to receive a first input voltage when in a first position, and that configures the power supply to receive a second input voltage when in a second position; and
    a second physical link, dependent on the first link, that further configures the power supply to receive the first input voltage when in a third position, and that configures the power supply to receive the second input voltage when in a fourth position.

2. A power supply for receiving an input voltage and providing output power comprising:
    a housing;
    a first link located inside the housing, that partially configures the power supply to receive a first input voltage when in a first position, and that configures the power supply to receive a second input voltage when in a second position;
    a second link, dependent on the first link, that further configures the power supply to receive the first input voltage when in a third position, and that configures the power supply to receive the second input voltage when in a fourth position; and
    a first indicator, connected to the first link and indicative that the first link is in the first position, visible from outside the housing when the first link is in the first position.

3. The power supply of claim 2, further including a second indicator, connected to the first link and indicative that the first link is in the second position, visible from outside the housing when the first link is in the second position.

4. The power supply of claim 3, wherein the housing includes at least one window through which the first indicator is visible when the first link is in the first position, and through which the second indicator is visible when the first link is in the second position.

5. The power supply of claim 4, wherein the first and second indicators include alpha-numeric characters.

6. The power supply of claim 3 wherein the first link includes a circuit board, moveable from the first position to the second position, and wherein the first and second indicators are mounted on the circuit board.

7. The power supply of claim 6, wherein the second link includes a plug moveable from a first receptacle to a second receptacle.

8. The power supply of claims 3, wherein the first link includes at least one set of copper bars moveable from the first position to the second position.

9. A power supply for receiving an input voltage and providing output power comprising:

a housing; and linking means, including first and second physical dependent links located inside the housing, for configuring the power supply to receive one of a first and second input voltage.

10. A power supply for receiving an input voltage and providing output power comprising:

a housing;

linking means, including first and second dependent links located inside the housing, for configuring the power supply to receive one of a first and second input voltage; and an indicator means, connected to the linking means, for indicating which input voltage the power source is connected to receive.

11. The power supply of claim 10, wherein the housing includes a viewing means for viewing the indicator means.

12. The power supply of claim 11 wherein the indicator means includes alpha-numeric characters.

13. The power supply of claim 9, wherein the first physical link includes a printed circuit board.

14. The power supply of claim 13, wherein the second physical link includes a plug moveable from a first receptacle to a second receptacle.

15. The power supply of claims 9, wherein the linking means includes at least one set copper bars moveable from a first position to a second position.

16. A method for selecting one of a plurality of input voltages comprising:

positioning a first physical link, located inside a power supply housing, to partially configure the power supply to receive a selected one of a first and second input voltage; and positioning a second physical link that is dependent on the first link, to further configure the power supply to receive the selected one of the first and second input voltage.

17. A method for selecting one of a plurality of input voltages comprising:

positioning a first link, located inside a power supply housing, to partially configure the power supply to receive a selected one of a first and second input voltage;

positioning a second link that is dependent on the first link, to further configure the power supply to receive the selected one of the first and second input voltage; and positioning a first indicator, indicative of for which input voltage the power supply is configured, such that it visible from outside the housing.

18. The method of claim 17, wherein positioning the indicator includes positioning the indicator under a window in the housing.

19. The method of claim 16, wherein positioning the indicator includes the step of positioning alpha-numeric characters under the window.

20. The method of claim 18, wherein positioning the first link includes positioning a printed circuit board.

21. The power supply of claim 20, wherein positioning the second link includes moving a plug.

22. The power supply of claims 17, wherein positioning the first link includes moving at least one set copper bars.

* * * * *